(12) United States Patent
D'Aluisio

(10) Patent No.: US 8,720,929 B2
(45) Date of Patent: May 13, 2014

(54) BICYCLE FRAME

(75) Inventor: Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/242,619

(22) Filed: Sep. 23, 2011

(65) Prior Publication Data

US 2013/0076001 A1 Mar. 28, 2013

(51) Int. Cl.
*B62K 19/02* (2006.01)
*B62K 19/30* (2006.01)
*B62K 3/02* (2006.01)

(52) U.S. Cl.
CPC ............... *B62K 19/02* (2013.01); *B62K 19/30* (2013.01); *B62K 3/02* (2013.01)
USPC ...................................... 280/281.1; 280/274

(58) Field of Classification Search
CPC ........ B62K 19/00; B62K 19/02; B62K 19/06; B62K 19/30; B62K 3/02; B62K 3/04
USPC ................. 280/281.1, 274; 72/367.1, 370.21, 72/379.6; 294/137, 258, 158
See application file for complete search history.

(56) References Cited

U.S. PATENT DOCUMENTS

| 4,582,259 | A * | 4/1986 | Hoover et al. | 239/559 |
| 7,393,125 | B1 * | 7/2008 | Lai | 362/473 |
| 7,584,978 | B2 * | 9/2009 | Pourias | 280/287 |
| 7,780,199 | B2 | 8/2010 | Narbaiza Gomez | |
| 2006/0138743 | A1 * | 6/2006 | Beal | 280/275 |

FOREIGN PATENT DOCUMENTS

AU 2007100444 A4 * 8/2007
FR 2636294 A1 * 3/1990

OTHER PUBLICATIONS

Velo News, BH G5: The channel under the downtube is a signature aspect on the BH bikes, internet article, dated Jun. 29, 2009, retrieved from: http://velonews.competitor.com/2009/06/news/bh-g5-the-channel-under-the-downtube-is-a-signature-aspect-on-the-bh-bikes_93985, 2 pages.

* cited by examiner

*Primary Examiner* — Joseph M Rocca
*Assistant Examiner* — Daniel Yeagley
(74) *Attorney, Agent, or Firm* — Michael Best & Friedrich LLP

(57) ABSTRACT

A bicycle frame including a head tube and a bottom bracket adapted to support a crankset. The frame also includes a tubular frame member that is coupled to the head tube and that has a concave section disposed on an underside of the frame member and spaced from the head tube.

12 Claims, 5 Drawing Sheets

BICYCLE FRAME

BACKGROUND

The present invention relates generally to bicycles, and more specifically to bicycle frames.

Bicycles commonly have a main frame and a front fork pivotally secured to the main frame. The main frame typically includes a top tube, a down tube, a seat tube, and a rear wheel mount for receiving a rear wheel axle. The front fork typically includes a front wheel mount for receiving a front wheel axle. Steering control of the bicycle is provided by a handlebar that is usually secured to the front fork via a handlebar stem.

In some situations, it is desirable to carry a bicycle. For example, it is often necessary to lift and carry a bicycle over an obstacle, such as a curb, fallen tree, or other obstruction. In fact, in competitive events known as cyclocross racing, obstacles are deliberately placed on the race course in order to force the rider to dismount the bicycle and carry the bicycle over the obstacle.

SUMMARY

The present invention provides a bicycle having a frame that facilitates carrying the bicycle. In one construction, the present invention provides a bicycle frame including a head tube, a bottom bracket that supports a crankset, and a tubular frame member that is coupled to the head tube and that includes a concave section disposed on an underside of the frame member and spaced from the head tube.

In another construction, the present invention provides a bicycle frame including a head tube, a bottom bracket adapted to support a crankset, and a tubular frame member that is coupled to the head tube and that defines a longitudinal axis. The frame member has a first length along the axis and includes a concave section disposed on an underside of the frame member. The concave section has a second length that is at most 40 percent of the first length.

In another construction, the present invention provides a bicycle frame including a head tube, a bottom bracket adapted to support a crankset, and a tubular frame member that is coupled to the head tube and that defines a longitudinal axis. The tubular frame member includes a concave section disposed on an underside of the tubular frame member. The concave section has a central recess and a curved ridge disposed along the central recess such that the central recess and the curved ridge cooperate to define a substantially oval-shaped depression in the tubular frame member.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
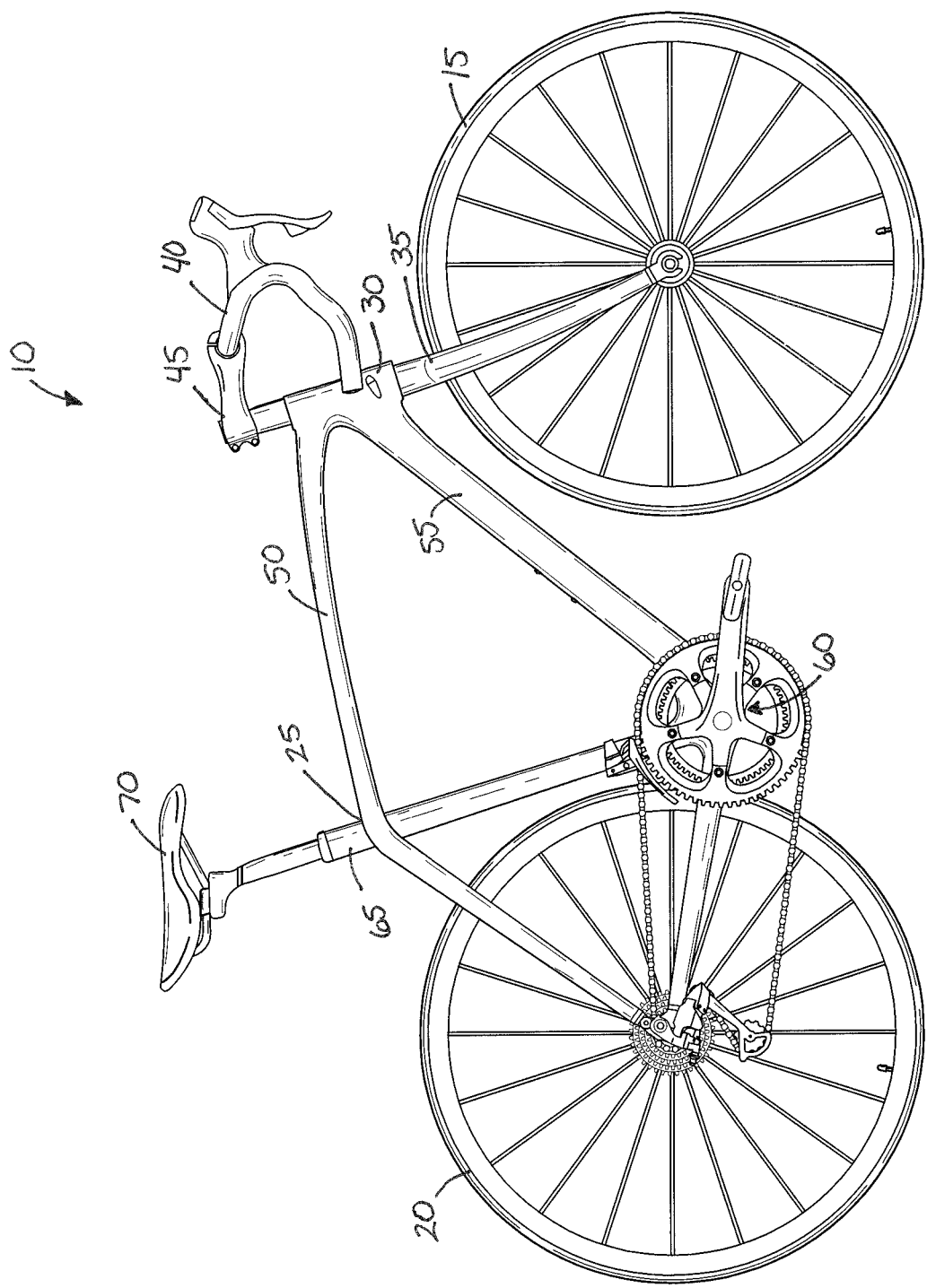
FIG. 1 is a side view of a bicycle having a frame embodying the present invention.

FIG. 1 shows a bicycle 10 (e.g., a cyclocross bicycle) that includes a front wheel 15, a rear wheel 20, and a frame 25. The frame 25 has a head tube 30 and a front fork 35 rotationally supported by the head tube 30 and that secures the front wheel 15 to the frame 25. A handlebar 40 and a stem assembly 45 secures the handlebar 40 to the front fork 35 such that movement of the handlebar 40 results in movement of the stem assembly 45 and the fork 35.

Figure 2:
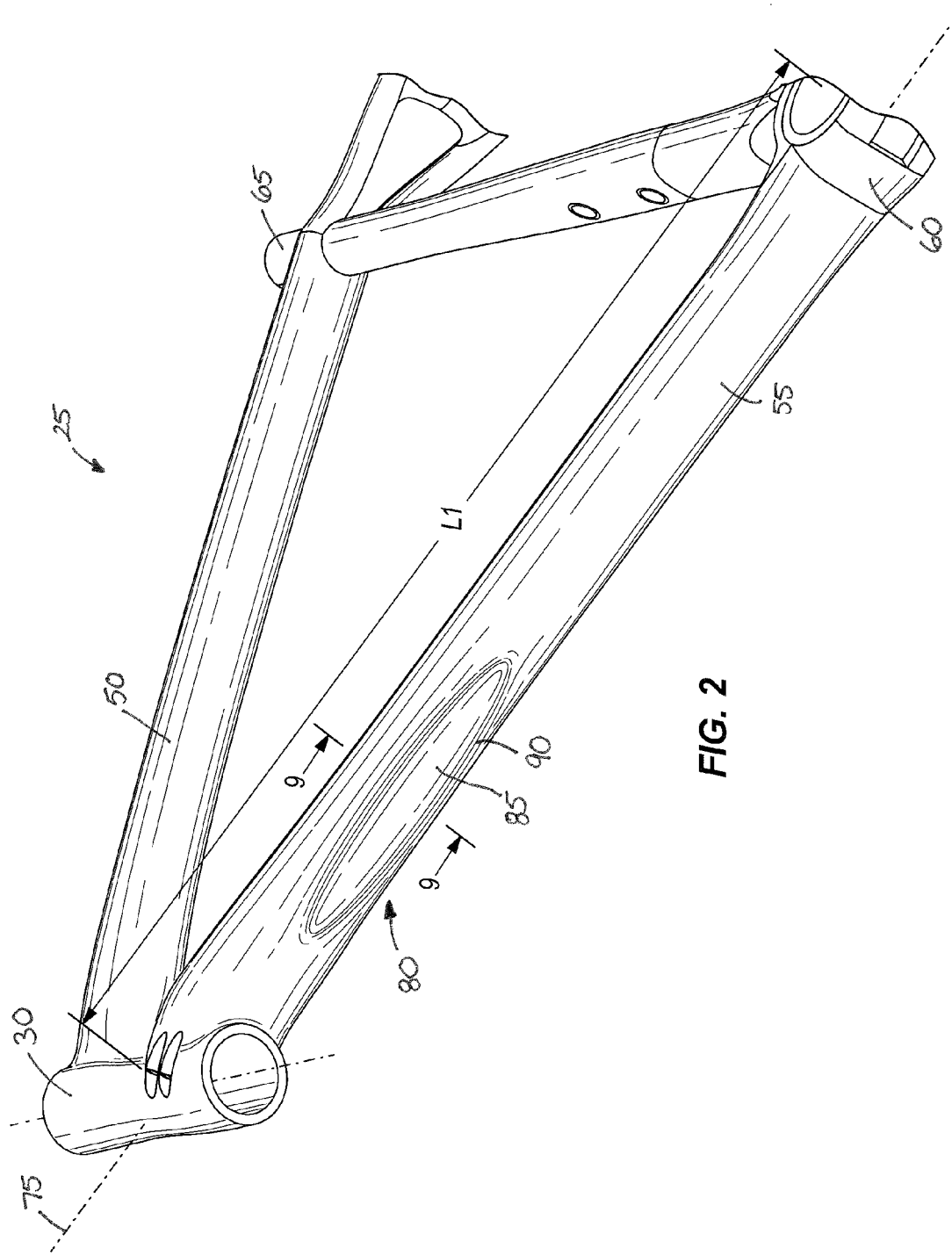
FIG. 2 is a lower perspective view of a portion of the frame of the bicycle illustrated in FIG. 1, including a top tube, a seat tube, and a down tube.

FIGS. 1 and 2 show that the frame 25 also has a top tube 50 connected to and extending rearward from the head tube 30, and a down tube 55 connected to the head tube 30 below the top tube 50 and extending generally downward toward a bottom bracket 60 of the frame 25. A seat tube 65 extends upward from the bottom bracket 60 and is connected to the top tube 50, and a seat 70 is supported by the seat tube 65.

Figure 3:
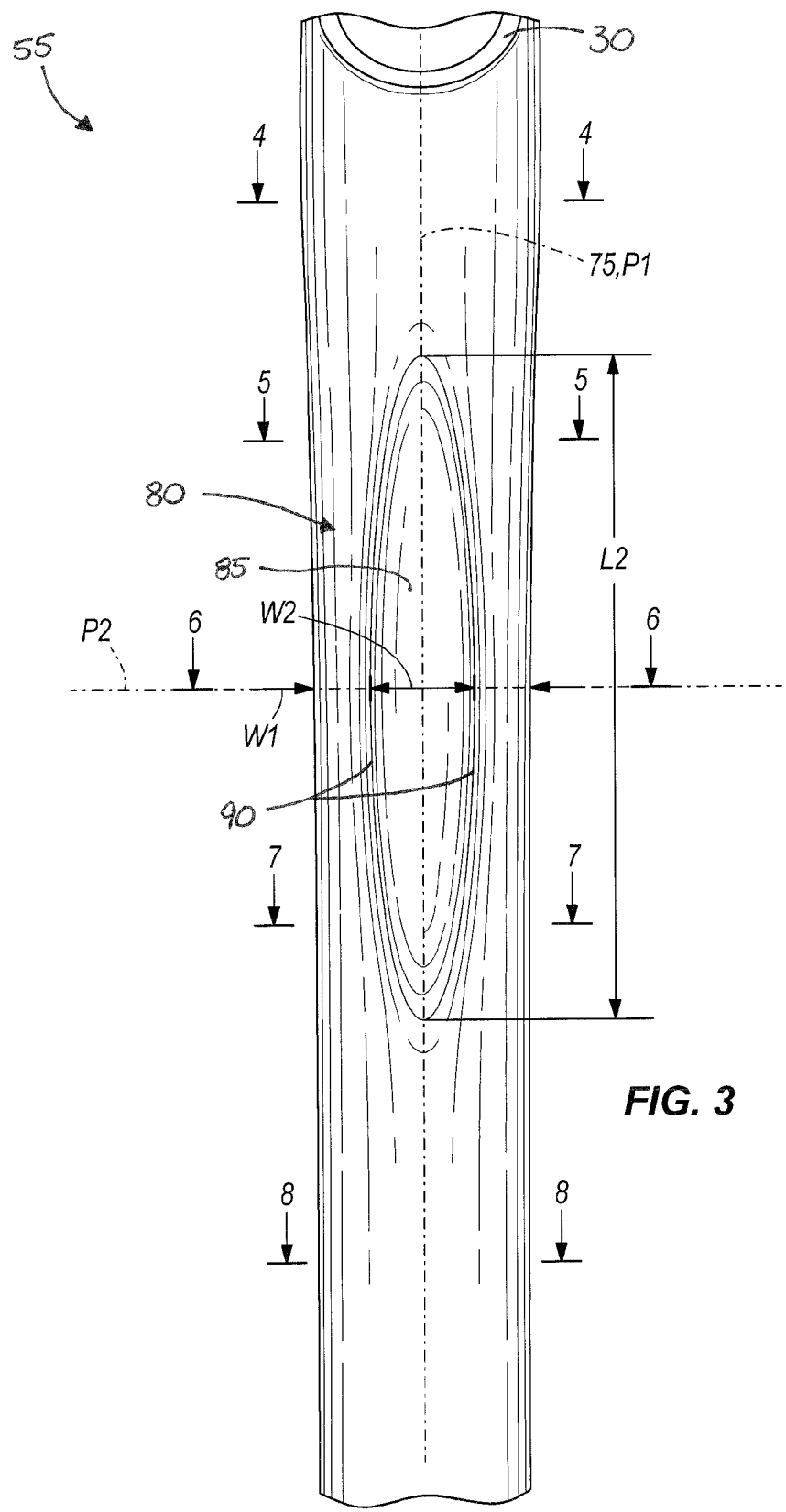
FIG. 3. is an underside view of the down tube of FIG. 2 illustrating a concave section.

The illustrated down tube 55 is coupled to the head tube 30 and to the bottom bracket 60, and extends in a generally downward and rearward direction from the head tube 30 to the bottom bracket 60. Referring to FIGS. 1-3, the down tube 55 defines a longitudinal axis 75. The down tube 55 has a length L1 that is measured along the axis 75 and a width W1 that is measured across the axis 75. Generally, the length L1 is measured from the intersection of the head tube 30 and the down tube 55 to the center of the bottom bracket 60 along the axis 75. The down tube 55 illustrated in FIGS. 1-3 has a length L1 of approximately 650 mm, although the length L1 can be any other suitable length.

With reference to FIGS. 2 and 3, the down tube 55 includes a concave section 80 that is disposed on an underside (i.e., facing generally downward toward the ground) of the down tube 55 to accommodate a hand of a bicycle rider. Alternatively, or in addition, the top tube 50 can include a concave section (not shown) that is similar to the concave section 80.

The illustrated concave section 80 is located between and spaced from the head tube 30 and the bottom bracket 60. As shown in FIG. 2, the concave section 80 is located closer to the head tube 30 than the bottom bracket 60, although the concave section 80 can be located near the middle portion of the down tube 55, or even closer to the bottom bracket 60 than the head tube 30, if desired. With reference to FIG. 3, the concave section 80 is substantially symmetrical about a vertical plane P1 (as viewed in FIG. 3) passing through the longitudinal axis 75, and is substantially symmetrical about a transverse plane P2 (as viewed in FIG. 3) that is perpendicular to the longitudinal axis 75.

The concave section 80 has a length L2 (e.g., 75-110 mm) measured along the longitudinal axis 75, and a width W2 (e.g., 10-27 mm) measured laterally across the axis 75. Generally, a ratio of the width W2 relative to the length L2 (W2/L2) for the concave section 80 is equal to or less than 0.25 to substantially correspond or conform to the ratio of the length of a portion of a person's fingers (e.g., the approximate length of one node of the fingers) relative to the width of the person's hand as measured across the fingers when the hand is loosely clenched. As illustrated, the width W2 of the concave section 80 is approximately 16 mm such that the ratio W2/L2 is approximately 0.15. Also, the length L2 of the concave section 80 depicted in FIG. 3 is approximately 105 mm such that the length L2 is approximately 16 percent of the length L1 of the down tube 55. Preferably, the length L2 of the concave section 80 is at most 40 percent of the length L1 of the down tube 55 to accommodate a person's hand while maintaining stiffness of the down tube 55. In some constructions, the length L2 is at most 30 percent of the length L1. In other constructions, the length L2 is at most 20 percent of the length L1.

Figure 9:
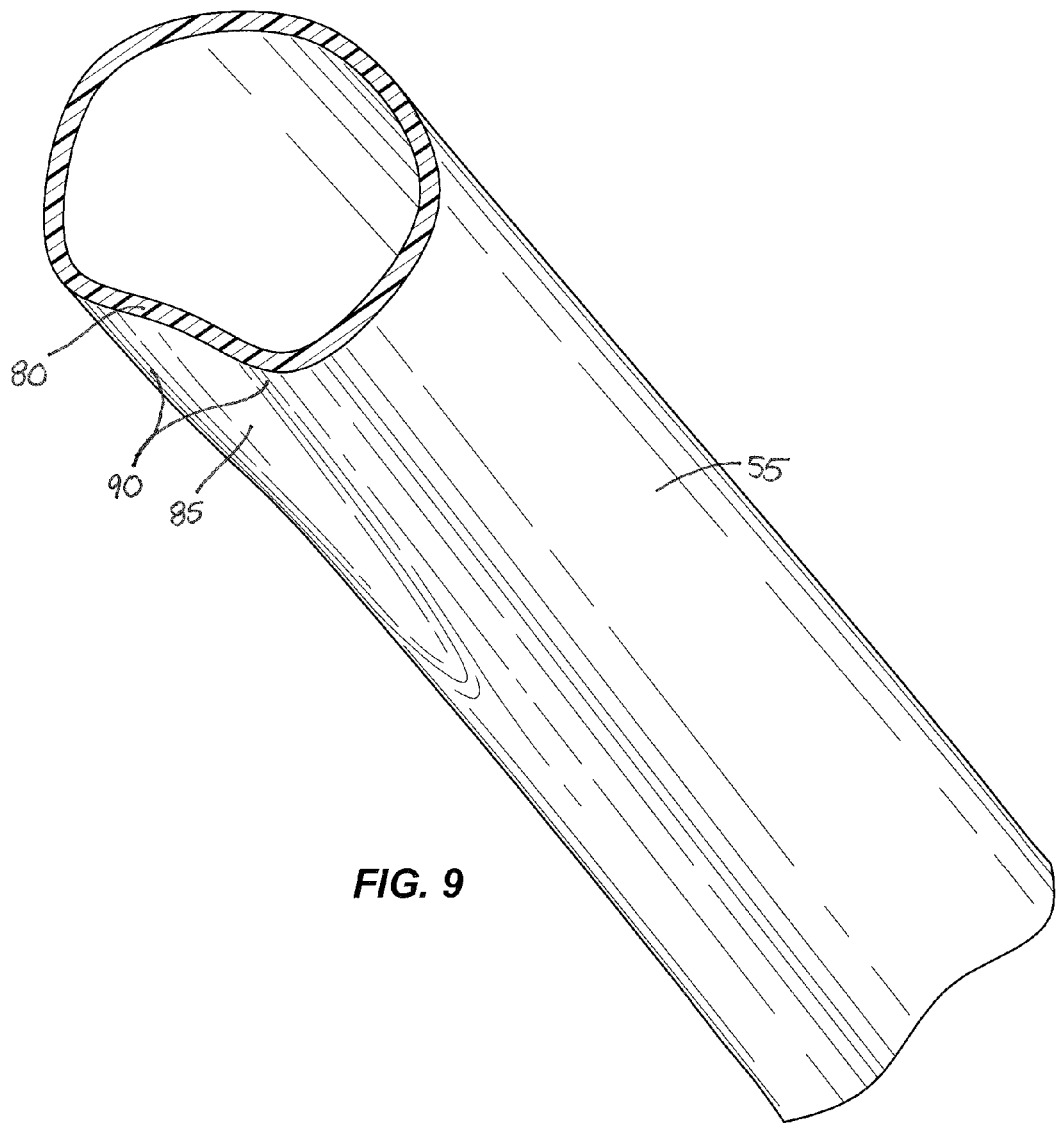
FIG. 9 is a perspective view of a portion of the down tube taken along line 9-9 in FIG. 2.

With reference to FIGS. 2, 3, and 9, the concave section 80 has a central recess 85 and a curved ridge 90 that defines a transition or boundary between the central recess 85 on the underside of the down tube 55 and the other surfaces of the down tube 55. Stated another way, the central recess 85 is formed in the down tube 55 such that concave section 80 defines a depression in the underside of the down tube 55. As illustrated, the curved ridge 90 extends circumferentially around the central recess 85 to define a substantially oval-shaped depression, as best shown in FIG. 3. Generally, the oval shape of the illustrated depression encompasses any smoothly-rounded, closed, convex shape (e.g., an ellipse).

Figure 4:
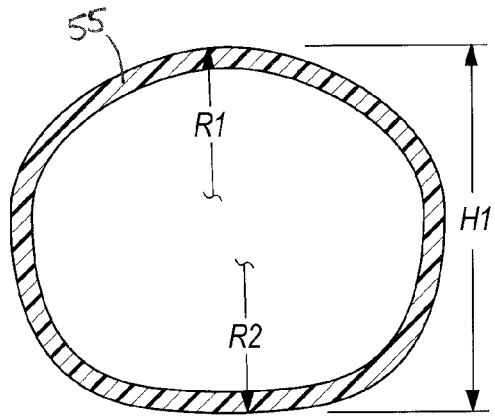
FIG. 4 is a cross-section of the down tube taken along line 4-4 in FIG. 3.

As illustrated in FIG. 4, the illustrated down tube 55 has an oblong or rounded trapezoidal (e.g., pentagonal) cross-sectional profile in the area between the head tube 30 and the concave section 80. In particular, the upper side of the down tube 55 at this location is rounded and is at least partially defined by a convex radius of curvature R1. The underside of the down tube 55 is slightly less rounded than the upper side, which is at least partially defined by a convex radius of curvature R2. At the location shown in FIG. 4, the down tube 55 has a first height H1 (e.g., 53 mm).

Figure 5:
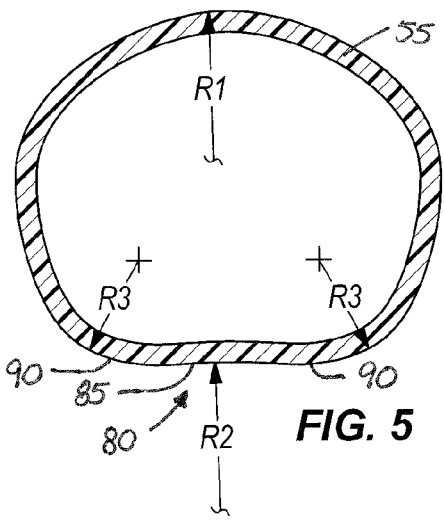
FIG. 5 is a cross-section of the down tube taken along line 5-5 in FIG. 3.

FIG. 5 illustrates the cross-sectional profile of the down tube 55 near a forward end of the concave section 80 (i.e., the area of the concave section 80 toward the head tube 30). At this location, the down tube 55 transitions from the oblong cross-sectional profile to a profile that has a rounded profile on the upper side and a substantially flat or slightly inwardly curved (i.e., concave) profile on the underside due to the central recess 85. In FIG. 5, the central recess 85 and the ridge 90 cooperate to define the profile of the underside of the down tube 55. As illustrated, at least a portion of the upper side has a convex radius of curvature R1 at this location, at least a portion of the central recess 85 has a concave radius of curvature R2, and at least a portion of the laterally opposed portions of the curved ridge 90 each has a convex radius of curvature R3.

Figure 6:
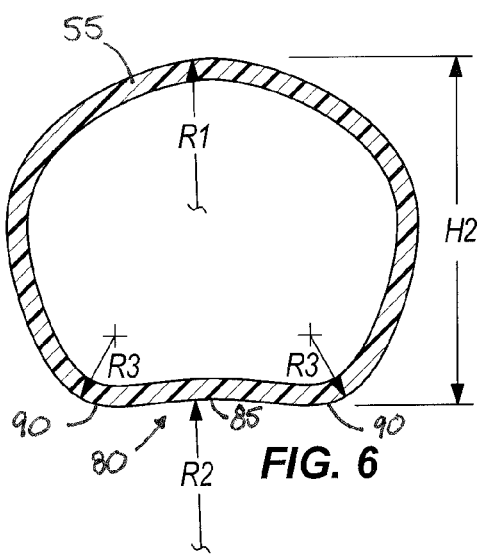
FIG. 6 is a cross-section of the down tube taken along line 6-6 in FIG. 3.

FIG. 6 illustrates that, at a longitudinal center of the concave section 80, at least a portion of the upper side of the down tube 55 has a convex radius of curvature R1, at least a portion of the central recess 85 defines a concave radius of curvature R2, and at least a portion of the laterally opposed portions of the curved ridge 90 define convex radii of curvature R3 such that the down tube 55 has a substantially kidney bean profile in cross-section. Stated another way, the radius of curvature R1 is larger than the radius of curvature R2, and the radii of curvature R1 and R2 are each larger than the radii of curvature R3. At the location shown in FIG. 6, the down tube 55 has a second height H2 (e.g., 50 mm) that is smaller than the first height H1.

Figure 7:
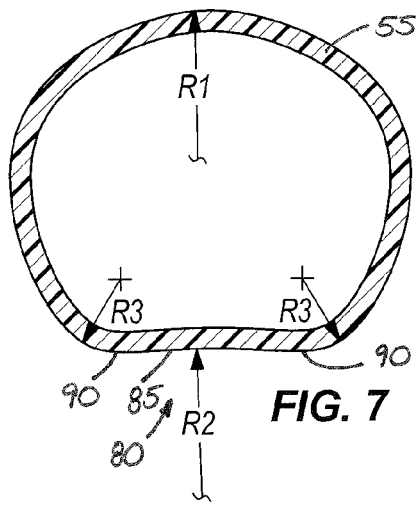
FIG. 7 is a cross-section of the down tube taken along line 7-7 in FIG. 3.

FIG. 7 illustrates the cross-sectional profile of the down tube 55 near a rearward end of the concave section 80 (i.e., the area of the concave section 80 toward the bottom bracket 60 and farthest from the head tube 30). At this location, the down tube 55 transitions from the kidney bean profile defined by the concave section 80 (FIG. 6) to an oblong cross-sectional profile that is very similar to the profile illustrated and described with regard to FIG. 5. As illustrated, at least a portion of the upper side has a convex radius of curvature R1 at this location, at least a portion of the central recess 85 has a concave radius of curvature R2, and at least a portion of the laterally opposed portions of the curved ridge 90 each has a convex radius of curvature R3.

Figure 8:
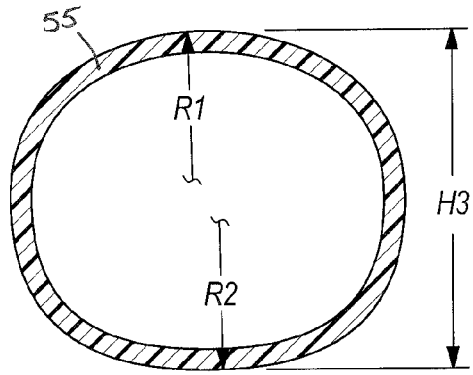
FIG. 8 is a cross-section of the down tube taken along line 8-8 in FIG. 3.

FIG. 8 shows that the down tube 55 has a substantially outwardly rounded or convex cross-sectional profile in the area between the concave section 80 and the bottom bracket 60. At the location illustrated in FIG. 8, at least a portion of the upper side of the down tube 55 has a convex radius of curvature R1, and at least a portion of the underside has a convex radius of curvature R2. At the location shown in FIG. 8, the down tube 55 has a third height H3 (e.g., 49 mm) that is smaller than the second height.

Table 1, produced below, sets forth the approximate dimensions and the relationship between the radii of curvature R1, R2, R3 for the cross-sectional profile of the down tube 55 as illustrated in FIGS. 4-8, which correspond to locations 4-8.

|    | Location 4 (FIG. 4) | Location 5 (FIG. 5) | Location 6 (FIG. 6) | Location 7 (FIG. 7) | Location 8 (FIG. 8) |
|----|---------------------|---------------------|---------------------|---------------------|---------------------|
| R1 | 31 mm               | 26 mm               | 23 mm               | 25 mm               | 37 mm               |
| R2 | 94 mm               | 108 mm              | 56 mm               | 108 mm              | 53 mm               |
| R3 | NA                  | 15 mm               | 10 mm               | 10 mm               | NA                  |

With reference to FIG. 6, at the longitudinal center of the concave section 80, the radius of curvature R2 for the curved ridge 90 is preferably between about 5 mm and 15 mm, and the width W1 of the down tube 55 is preferably between about 30 mm and 75 mm. Generally, the radius of curvature R2 of the curved ridge 90 at the longitudinal center is preferably between about 8 percent and 35 percent of the width W1 of the down tube 55 to avoid relatively sharp edges on the down tube 55. The illustrated down tube 55 at the longitudinal center has a radius of curvature R2 of approximately 10 mm, and a width W1 that is approximately 59 mm. As such, the illustrated radius of curvature is approximately 17 percent of the width W1.

As illustrated in FIGS. 4-9, the upper side surface profile of the down tube 55 has a substantially rounded profile that is maintained along the entire length of the down tube 55. The underside of the down tube 55 transitions from the less-rounded profile between the head tube 30 and the concave section 80 to the inwardly curved or kidney bean profile defined by the central recess 85, and then to the more-rounded profile between the concave section 80 and the bottom bracket 60.

With reference to FIGS. 1-3 and 9, the depression defined by the central recess 85 provides an area of the down tube 55 that a user, such as a cyclocross rider, can securely and comfortably grasp. Stated another way, the profile of the down tube 55 at the concave section 80 is ergonomically designed to substantially conform to the profile of the rider's hand so that the bicycle 10 can be comfortably and stably lifted (e.g., over an obstacle, or so that the top tube 50 rests on the rider's shoulder) by the rider. In particular, the upper rounded profile of the down tube 55 conforms to the area between the rider's index finger and the thumb, whereas the central recess 85 and the ridge 90 conform to the profile of the padded side of the rider's fingers. The illustrated concave section 80 is located closer to the head tube 30 than the bottom bracket 60 (i.e., substantially forward of a longitudinal center of the down tube 55) so that the rider does not have to reach too far to firmly grasp the down tube 55.

Various features and advantages of the invention are set forth in the following claims.

The invention claimed is:

1. A bicycle frame comprising:
   a head tube;
   a bottom bracket adapted to support a crankset;
   a seat tube extending upward from the bottom bracket; and
   a tubular frame member coupled between the head tube and the seat tube and having a longitudinal axis, the tubular frame member including a concave section disposed on an underside of the frame member and spaced from the head tube without extending beyond a longitudinal midpoint of the tubular frame member, the concave section located closer to the head tube than the seat tube,
   wherein, in cross-section taken through the concave section and across the longitudinal axis, the underside has a concave profile.

2. The bicycle frame of claim 1, wherein the tubular frame member is a down tube coupled to the head tube and the bottom bracket, and wherein the concave section is located between the head tube and the bottom bracket.

3. The bicycle frame of claim 2, wherein the concave section is spaced from the bottom bracket.

4. The bicycle frame of claim 1, wherein the concave section is located closer to the head tube than to the bottom bracket.

5. The bicycle frame of claim 1, wherein the tubular frame member defines a longitudinal axis and has a first length along the axis, and wherein the concave section extends along the longitudinal axis and has a second length that is at most 40 percent of the first length.

6. The bicycle frame of claim 1, wherein the concave section has a central recess and a curved ridge at least partially surrounding the central recess to define a substantially oval-shaped depression in the tubular frame member.

7. The bicycle frame of claim 1, wherein the concave section has a central recess and a curved ridge laterally disposed along the central recess, and wherein at a longitudinal center of the concave section, the tubular frame member has a width and the curved ridge has a radius of curvature that is at least 8 percent of the width.

8. The bicycle frame of claim 1, wherein the concave section has a width and a length defining a ratio of width/length, and wherein the ratio is equal to or less than 0.25.

9. A bicycle frame comprising:
   a head tube;
   a bottom bracket adapted to support a crankset; and
   a down tube coupled to the head tube and the bottom bracket, the down tube defining a longitudinal axis, the down tube including a concave section disposed on an underside of the down tube, the concave section spaced from the head tube and the bottom bracket and located closer to the head tube than the bottom bracket, the concave section having a central recess and a curved ridge disposed along and at least partially surrounding the central recess to define a substantially oval-shaped depression in the down tube.

10. The bicycle frame of claim 9, wherein at a longitudinal center of the concave section, the down tube has a width and the curved ridge has a radius of curvature that is at least 8 percent of the width.

11. The bicycle frame of claim 9, wherein the concave section is spaced from the head tube.

12. The bicycle frame of claim 9, wherein the concave section has a width and a length defining a ratio of width/length, and wherein the ratio is equal to or less than 0.25.

* * * * *